United States Patent
Lee et al.

(10) Patent No.: US 7,274,656 B2
(45) Date of Patent: Sep. 25, 2007

(54) PROTECTION SYSTEM AND METHOD FOR RESILIENT PACKET RING (RPR) INTERCONNECTION

(75) Inventors: Byoung-Joon Lee, Ottawa (CA); James Benson Bacque, Ottawa (CA)

(73) Assignee: Tropic Networks Inc., Kanata, Ontario (CA)

( * ) Notice: Subject to any disclaimer, the term of this patent is extended or adjusted under 35 U.S.C. 154(b) by 965 days.

(21) Appl. No.: 10/191,548

(22) Filed: Jul. 10, 2002

(65) Prior Publication Data
US 2003/0012129 A1    Jan. 16, 2003

(51) Int. Cl.
*G01R 31/08* (2006.01)
(52) U.S. Cl. .................. 370/223; 370/404; 370/406
(58) Field of Classification Search ........ 370/221–225, 370/403, 404; 704/2, 714; 398/54, 58, 59
See application file for complete search history.

(56) References Cited

U.S. PATENT DOCUMENTS

| | | | | |
|---|---|---|---|---|
| 5,491,686 | A * | 2/1996 | Sato ............................ | 370/223 |
| 6,956,816 | B1 * | 10/2005 | Alexander et al. .......... | 370/222 |
| 6,990,068 | B1 * | 1/2006 | Saleh et al. .................. | 370/225 |
| 2002/0169861 | A1 * | 11/2002 | Chang et al. ................ | 709/223 |
| 2003/0021226 | A1 * | 1/2003 | Mor ........................... | 370/223 |

OTHER PUBLICATIONS

Aybay, G., et al, "An Introduction to Resilient Packet Ring Technology", A White Paper by the Resilient Packet Ring Alliance, Oct. 2001.

LeBel, P., Bell Canada RPR Requirements, IEEE 802.17 Interim Meeting, May 2001.

Young, G., SBC Priorities and Objectives for Resilient Packet Ring Development:, IEEE 802.17, Mar. 12, 2001.

Milliron, D., "A CLEC Perspective", IEEE 802.17, RPR Working Group, May 14, 2001.

Busi, I., et al, "Network Requirements for RPR", Alcatel Optics.

* cited by examiner

*Primary Examiner*—Doris H. To
*Assistant Examiner*—Ian N. Moore
(74) *Attorney, Agent, or Firm*—Victoria Donnelly

(57) ABSTRACT

A failure protection between interconnected adjacent Resilient Packet Rings (RPRs) in a multiple RPR network is provided. Two paths, a regular message path and a protection path, are provided between two adjacent RPRs. The regular path is used for routing inter-ring messages when no failure has occurred on the path. Messages are rerouted through the protection path when a failure occurs on the regular path. Each of these paths has two RPR interface nodes (one for each RPR) that are connected to an interconnection device (a layer 2 bridge or a layer-3 router) through interconnection links. Procedures for detecting failures and generating notifications for message rerouting and fault reports are executed at the interconnection devices. The procedures use periodic keep alive messages for diagnosing network segment and interconnection device failures. The fault detection and message rerouting are accomplished in less than 50 ms.

15 Claims, 12 Drawing Sheets

PROTECTION SYSTEM AND METHOD FOR RESILIENT PACKET RING (RPR) INTERCONNECTION

FIELD OF INVENTION

The invention relates to systems and methods of failure protection between inter-connected RPRs.

BACKGROUND OF THE INVENTION

Resilient Packet Ring (RPR) is an effective solution for metropolitan area data transport applications. RPR is a Media Access Control (MAC) protocol that operates at Layer-2 of the OSI (Open System Interconnection) protocol stack. RPR provides a ring topology for interconnection among nodes that exchange data with one another. It provides a packet ADM (Add-Drop Multiplexer) architecture and is compatible with Ethernet, SONET (Synchronous Optical NETwork), or DWDM (Dense Wavelength Division Multiplexing) physical layer standards. RPR has a number of characteristics that are responsible for its popularity and are briefly described in a white paper by the RPR Alliance "An Introduction to Resilient Packet Ring Technology", by Gunnes Aybay, Mannix O'Connor, Kanaiya Vasani and Tim Wu, October 2001. RPR that employs a packet ring technology has the inherent advantage of implementing bandwidth fairness algorithms that are concerned with the allocation of a "fair share" of the ring bandwidth to every customer. Being a packet ring, an RPR can handle multicasting effectively: every node can receive and forward the packet circulating on the ring. An RPR system, in which nodes share a common medium, provides a simplified service model that enables carriers to provide services in a short period of time. An important feature of the RPR is its resiliency to failures such as a fiber cut. The RPR is also self-healing, i.e., a packet that cannot proceed in the original direction due to the failure, can reach the destination by going around the ring in an opposite direction.

RPR protection handles failures within a given RPR with a guarantee that a protection switching will be completed in less than 50 ms. There is a need to provide similar levels of protection for interconnected RPRs.

Such interconnected rings are expected in large metropolitan areas [Ref: Bell Canada RPR Requirements, IEEE 802.17 Interim Meeting, May 2001, by Paul LeBel]. Using a single bridge or router between two interconnected rings leads to a single point of failure: if the interconnection device fails, an inter-ring message cannot be delivered. Robust protection mechanisms equivalent to those provided in SONET are discussed in "SBC Priorities and Objectives for Resilient Packet Ring Development", by George Young, SBC Technology Resources, Inc., IEEE 802.17, Mar. 12, 2001. Protection requirement for interconnected rings specified in SONET is achieved through a set of double interconnection devices, e.g., GR-1230-CORE and GR-1400-CORE. Dual attachment points on different rings for providing an additional protection path is also addressed in "RPR Requirements, A CLEC Perspective", by Dave Milliron, IEEE 802.17, RPR Working Group, May 14, 2001 and "NETWORK REQUIREMENTS FOR RPR", by Italo Busi and Vittorio Mascolo, Alcatel Optics.

However, dual attached interconnections using Layer-2 bridging (or routing) rely on the Spanning Tree Protocol (STP) [IEEE 802.3D STP Standard] or Layer-3 routing protocols (such as OSPF or VRRP) that exhibit large convergence times, typically in the order of seconds.

Accordingly, there is a strong requirement for further improvement of the network protection mechanisms which would achieve protection switching in shorter periods of time that are comparable to the protection switching times specified for a single RPR.

SUMMARY OF THE INVENTION

According to one broad aspect of the present invention, a method for failure protection between interconnected RPRs in a multiple RPR network is provided. The multiple RPR network, including at least two adjacent RPRs, a first RPR and a second RPR, for sending/receiving inter-ring messages using a path; the first RPR including at least one node to be used as a source node provided for sending messages and a first RPR interface node and a second RPR interface node; the second RPR including at least one node to be used as a destination node provided for receiving messages and a third RPR interface node and a fourth RPR interface node. The method comprises the steps of detecting a failure in the path between the first RPR and the second RPR; and rerouting messages from the source node in the first RPR to the destination node in the second RPR, upon detection of the failure. The method further comprises the steps of providing a regular path for routing inter-ring traffic between the two adjacent RPRs when no failure has occurred in the path; and providing a protection path for routing inter-ring traffic between the two adjacent RPRs, when a failure occurs in the regular path.

The steps of providing each of the regular and the protection path, further comprises of the steps of providing an interconnection device and two RPR interface nodes, one from each RPR associated with the path between adjacent RPRs and a set of interconnection links provided for connecting each RPR interface node associated with the respective path to the associated interconnection device.

Each interconnection device and its neighboring RPR interface node on the regular and protection path exchange periodic Type-2 messages. If one of the RPR interface nodes does not receive a Type-2 message from its adjacent node (RPR interface node or interconnection device) for N2 successive periods, it decides that either the other node or the interconnection link is down. This is diagnosed as a segment failure.

If the failure is on the regular path, the source node that is generating the traffic, as well as the O&M system are notified. Upon receiving such a notification the source node redirects the traffic using the protection path. If the failure does not impair the regular path no messages are sent to the source node but the O&M system is notified.

According to another aspect of the present invention, there is provided a system for failure protection between interconnected RPRs in a multiple RPR network. The network includes at least two adjacent RPRs, a first RPR and a second RPR for sending/receiving messages using a path; the first RPR including at least one node to be used as a source node provided for sending messages and a first interface node and a second interface node; the second RPR including at least one node to be used as a destination node provided for receiving messages and a third RPR interface node and a fourth RPR interface node. The system comprises means for detecting a failure in the path between the first RPR and the second RPR; and means for rerouting messages from the source node in the first RPR to the destination node in the second RPR, upon detection of the failure. The path includes a regular path, provided for routing inter-ring traffic between the two adjacent RPRs when no failure has occurred in the path; and a protection path, provided for routing inter-ring traffic between the two adjacent RPRs, when a failure occurs in the regular path.

The regular path includes a first interconnection device, connecting the first RPR interface node and the fourth RPR interface node, associated with the regular path between the first RPR and the second RPR; and a first set of interconnection links, including a first interconnection link and a fourth interconnection link, for connecting the first RPR interface node and the fourth RPR interface node respectively to the first interconnection device. The protection path includes a second interconnection device connecting the second RPR interface node and the third RPR interface node, associated with the protection path between the first RPR and the second RPR; and a second set of interconnection links including a second interconnection link and a third interconnection link, for connecting the second RPR interface node and the third RPR interface node respectively, to the second interconnection device.

A second embodiment of the present invention provides a method for failure protection between interconnected RPRs in a multiple RPR network, the network including at least two adjacent RPRs, a first RPR and a second RPR for sending/receiving inter-ring messages using a set of dual interconnection units as path. Each RPR includes at least one node to be used as a source node provided for sending messages or a destination node provided for receiving messages and two RPR interface nodes. The method comprises steps of detection of a failure in the path between the two adjacent RPRs and rerouting messages from the source node in one RPR to the destination node in the adjacent RPR, upon detection of failure. The path between the two adjacent RPRs comprises a regular path provided through a first interconnection unit for routing inter-ring traffic between the two adjacent RPRs when no failure has occurred in the path and a protection path provided through a second interconnection unit for routing inter-ring traffic between the two adjacent RPRs, when a failure occurs in the regular path.

Another aspect of the second embodiment of the invention provides a system for failure protection between interconnected RPRs in a multiple RPR network. The system includes at least two adjacent RPRs, a first RPR and a second RPR for sending/receiving messages, using a set of dual interconnection units as path. The first RPR includes at least one node to be used as a source node provided for sending messages and a first RPR interface node and a second RPR interface node; the second RPR includes at least one node to be used as a destination node provided for receiving messages and a third RPR interface node and a fourth RPR interface node. The path includes, a regular path provided for routing inter-ring traffic between the two adjacent RPRs when no failure has occurred in the path; and a protection path provided for routing inter-ring traffic between the two adjacent RPRs, when a failure occurs in the regular path. The system further includes, means for detecting a failure in the path between the two adjacent RPRs; and means for rerouting messages from the source node in one RPR to the destination node in the adjacent RPR, upon detection of the failure.

The present invention overcomes the problem of large convergence times, typically in the order of seconds in existing art, by offering faster protection mechanisms that achieve protection switching in shorter period of time. In the present invention a protection switching is completed in less than 50 ms in interconnected RPRs.

BRIEF DESCRIPTION OF THE DRAWINGS

Further features and advantages of the invention will be apparent from the following description of preferred embodiments, which are described by way of example only and with reference to the accompanying drawings, in which.

DETAILED DESCRIPTION OF THE INVENTION

Figure 1:
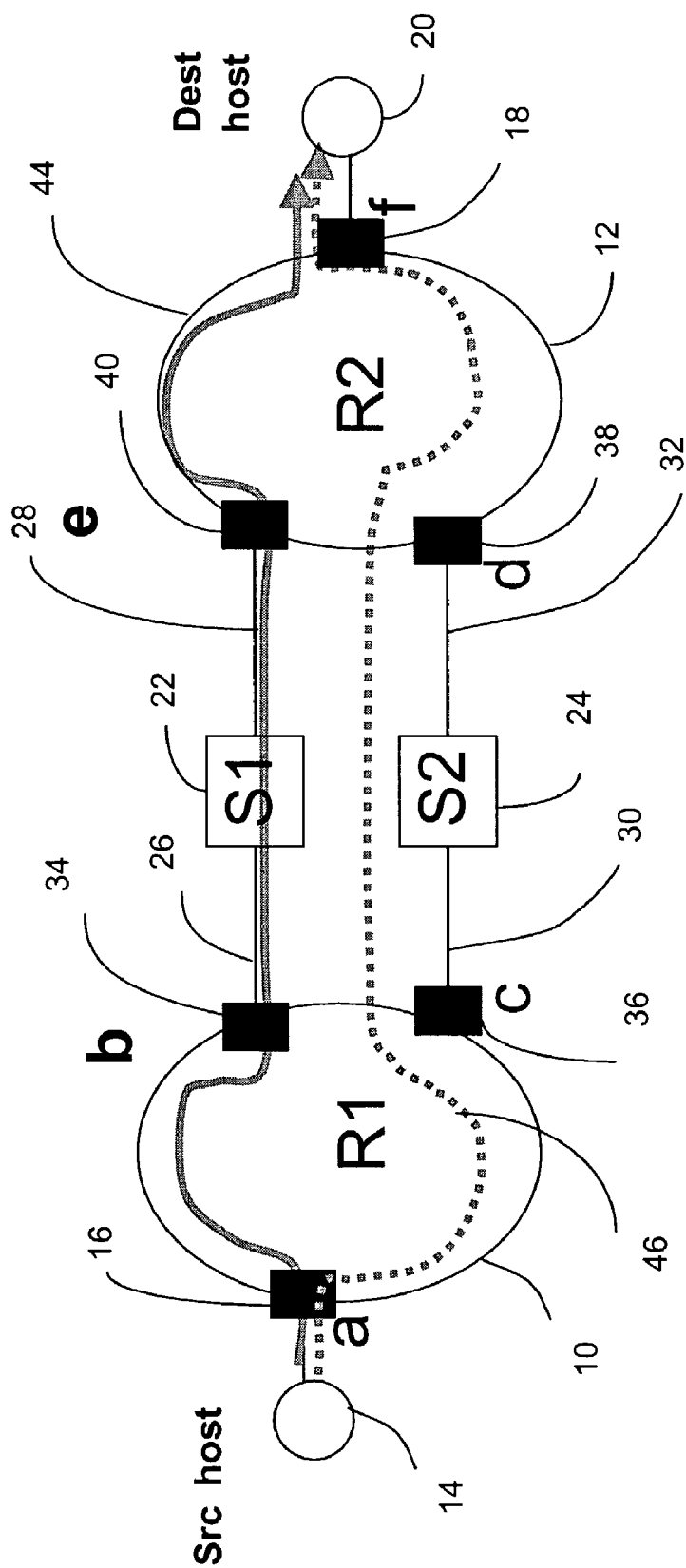
FIG. 1 shows a protected interconnection system for two RPRs using two interconnection devices according to a first embodiment of the invention.

The protection method and system can be used to interconnect multiple RPRs within which an embodiment of the invention may be employed. FIG. 1 shows a protection system for two interconnected RPRs, in which the failure protection method between any two adjacent RPRs, in a multiple ring system is illustrated. Two RPRs, a first RPR R1 10 and a second RPR R2 12 are interconnected. Each RPR connects a number of RPR nodes. A source host 14 connected to a source node "a" 16 in the first RPR R1 10, for example, can send a message to a destination node "f" 18 that is connected to a destination host 20 in the second RPR R2 12. The protection method is based on providing two paths between two interconnected rings. One of the paths called the regular path 44 is used for routing inter-ring traffic, whereas the other path, called the protection path 46, is used when a failure occurs and the regular path 44 (used for carrying the inter-ring traffic), becomes unavailable. The method provided by the invention, uses two interconnection devices (e.g., layer 2 bridges or layer 3 routers) each of which provides a separate independent path between the two rings. A first interconnection device S1 22 and a second interconnection device S2 24 in FIG. 1 are the interconnection devices connecting the first RPR R1 10 and the second RPR R2 12. The first interconnection device S1 22 is connected to the first RPR R1 10 and the second RPR R2 12 through interconnection links, e.g., the first interconnection link "S1-b" 26 and the fourth interconnection link "S1-e" 28 respectively. Similarly, the second interconnection device S2 24 is connected to the first RPR R1 10 and the second RPR R2 12, through the second interconnection link "S2-c" 30 and the third interconnection link "S2-d" 32 respectively.

The system objective is to handle failures of any interconnection link or any interconnection device or any of the RPR nodes (b, c, d, and e) that are directly connected to an interconnection device. Three types of failures are handled by the method: an RPR node failure, an interconnection device failure, and an interconnection link failure. In case of a failure of a component in the regular path 44, the source node that generate messages are notified to reroute messages through the protection path (a-c-S2-d-f) 46, for example. The protection switching is achieved in less than 50 ms. An RPR link failure does not concern the system and is handled by the RPR protection switching mechanism.

Figure 2:
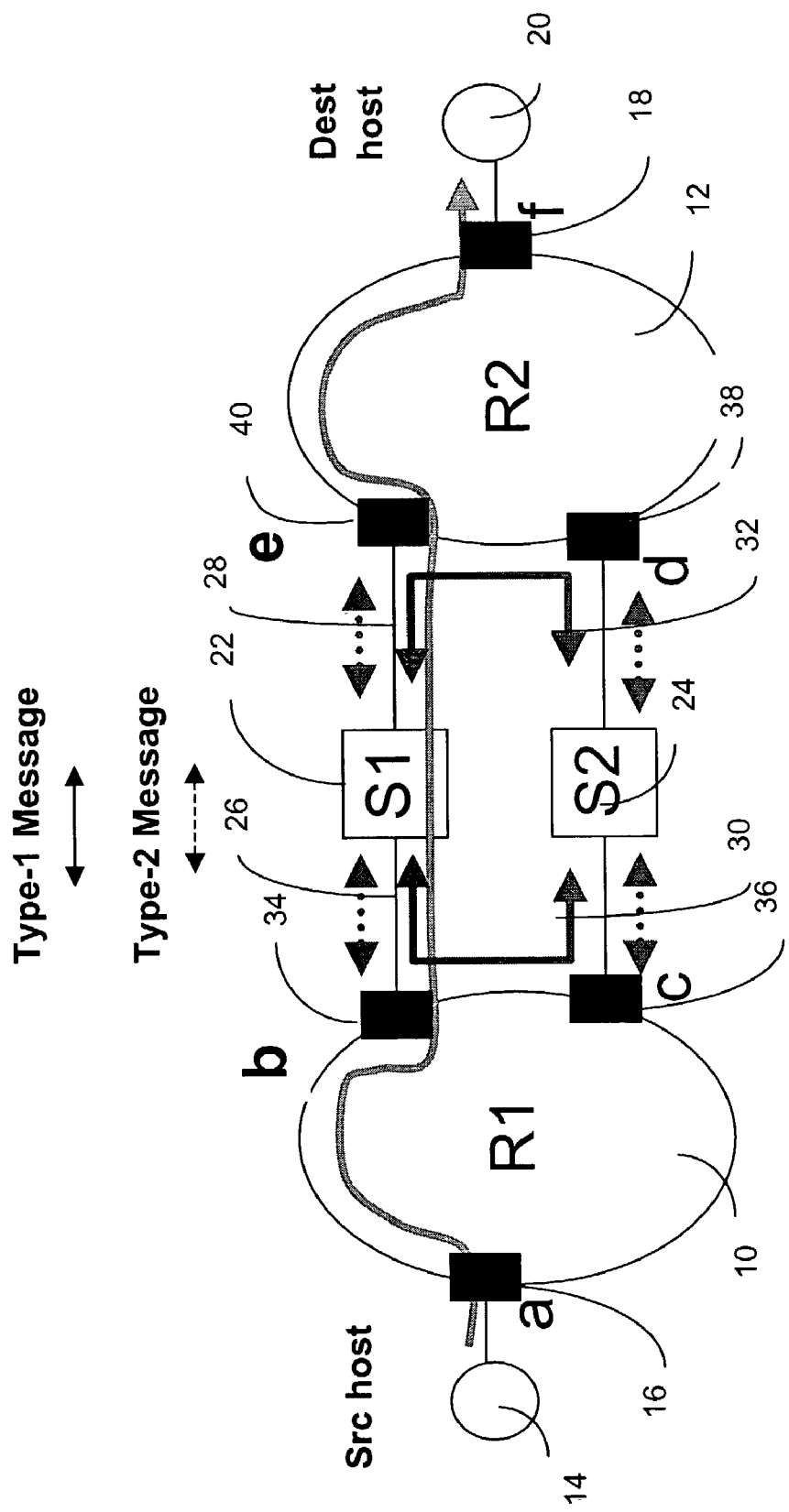
FIG. 2 illustrates a protection method using Type-1 and Type-2 message.

The control message based failure detection method used in the first embodiment is presented in FIG. 2. There are two components of the protection method: failure detection and failure notification. Failure detection is achieved by using periodic "keep-alive" messages that are exchanged between nodes. A keep-alive message is a short control message between two nodes, for example "x" and "y". The reception of a keep-alive message from "y" at "x" indicates that "y" as well, as all the nodes and links in the interconnection path between "x" and "y" are alive (free from failure). The viability of such keep-alive messages is well known in various distributed processing contexts and is deployed in the novel protection method provided by this invention. Two types of keep-alive messages are used in the invention.

Type-1 messages are sent by each interconnection device S1 22 or S2 24 to the other with a period T1. T1 is programmable, with 10 ms being a typical value. The Type-2 messages are exchanged between an RPR interface node and the associated interconnection device connected by a single link, with a period T2, where T2 is smaller than T1. T2 is programmable with 3 ms being a typical value.

The interconnection network used in this invention is a ring in itself. Type-1 and Type-2 messages are sent by the appropriate nodes in both directions by using the two links connecting a given node to its two neighbors. If a keep-alive message from any one of the interconnection devices Sj (j=1, 2) through any of the paths, is not received by another interconnection device Si (i=3−j) for N1 successive periods, Si decides that the interconnection device has failed. On the other hand, if a keep-alive message arriving only via one path, this indicates a failure in one of the links or RPR interface nodes in the other path. The number of successive periods N1 is programmable with 3 periods as a typical value. The failed segment containing an RPR interface node and an interconnection link is identified with the help of Type-2 keep-alive messages that are described next.

Each interconnection device and its neighboring RPR interface node on the regular and protection paths exchange periodic Type-2 messages. If one of the RPR interface nodes does not receive a Type-2 message from its adjacent node for N2 successive periods, it decides that either the other RPR interface node or the interconnecting link is down. This is diagnosed as a "segment failure". For example, if the first interconnection device S1 22 does not receive a Type-2 message from the first RPR interface node "b" 34 for N2 consecutive periods, the segment consisting of the first RPR interface node "b" 34 and the first interconnection link S1-b 26 must have failed. Successive periods N2 is programmable with 3 as a typical value. Failure information is piggy-backed onto the Type-1 messages that are used by the interconnection devices to locate the failure and initiate corrective actions. The corrective actions are implemented through notification messages. When a failure at an RPR interface node, interconnection device or a segment occurs, it is reported to the Operation and Maintenance (O&M) system, which in turn initiates the appropriate repair procedures. If the failure is on the regular message path, the source node that is generating traffic is notified. Upon receiving such a notification, the source node redirects the traffic using the protection path. If the failure does not impair the regular message path, no messages are sent to the source node, but the O&M system is notified.

Figure 3:
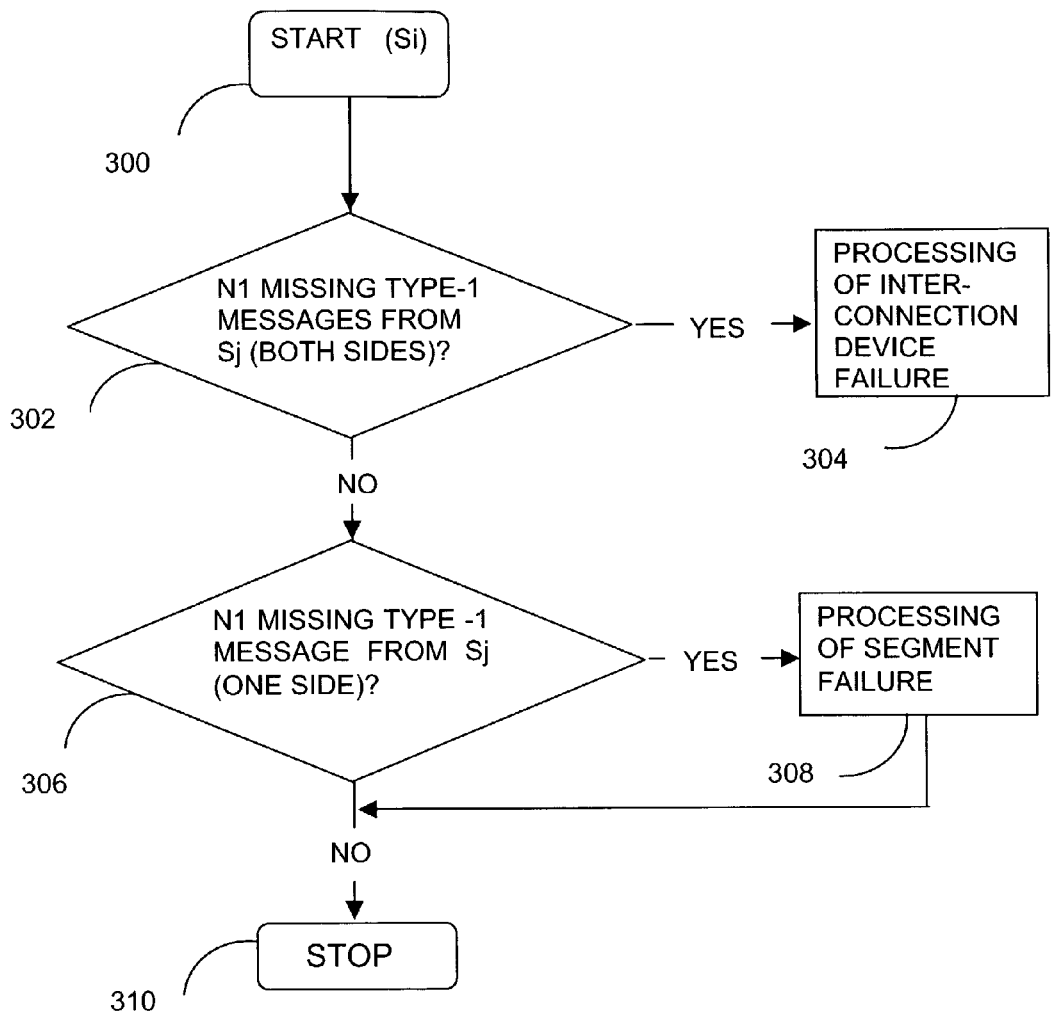
FIG. 3 illustrates steps of the failure detection and notification method, running at an interconnection device.
Figure 4:
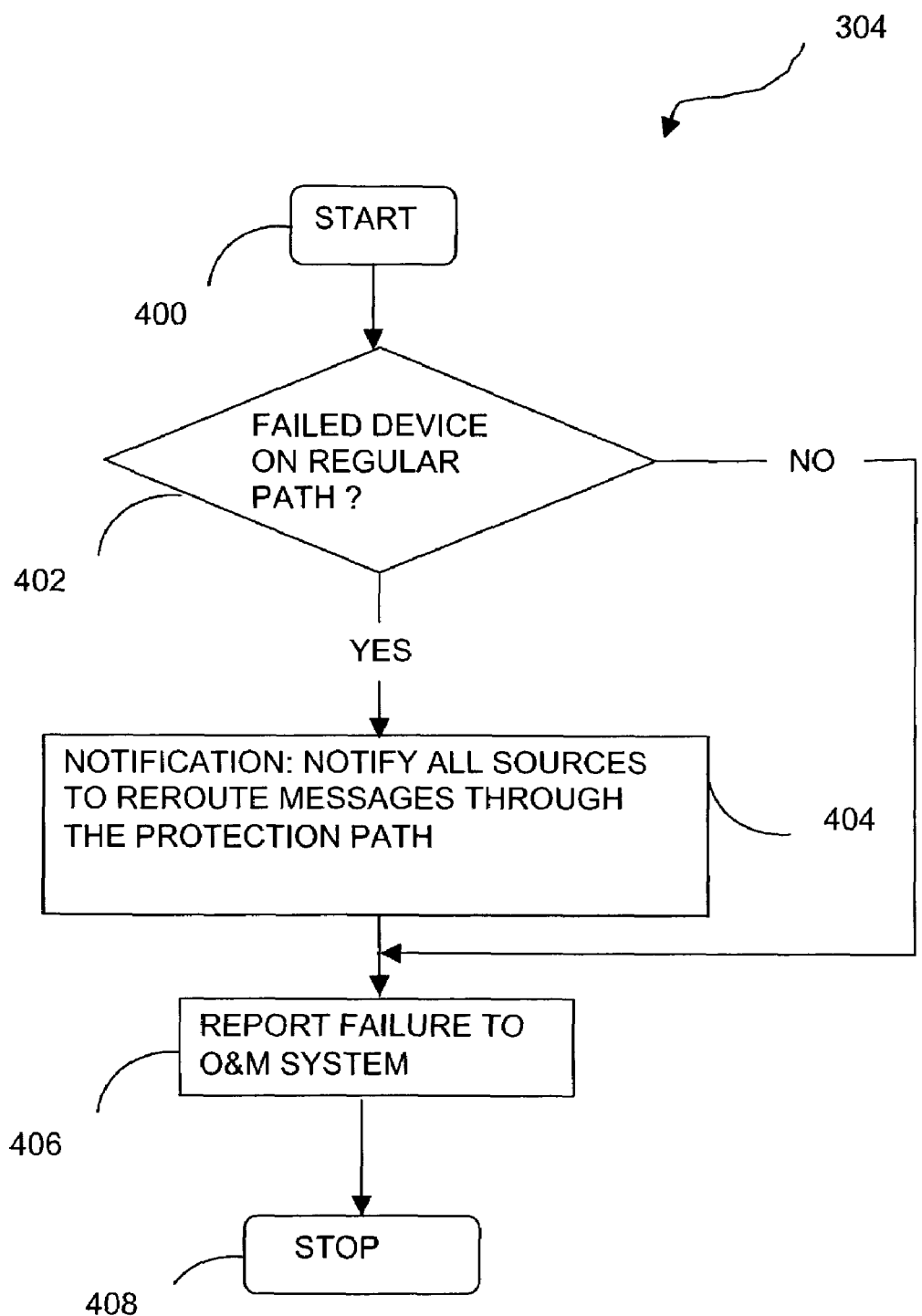
FIG. 4 shows the step 304 of FIG. 3 for handling an interconnection device failure in more detail.
Figure 5:
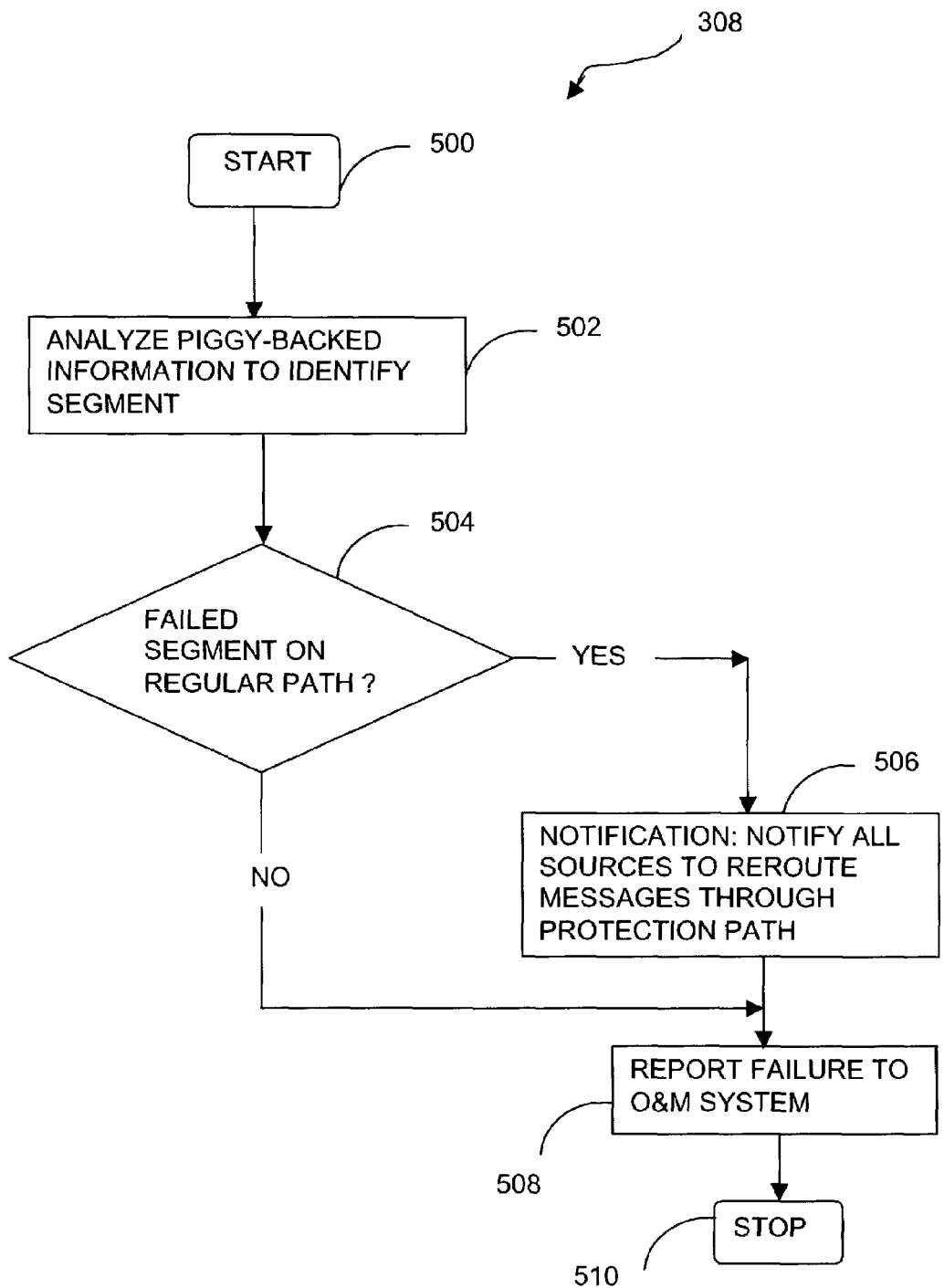
FIG. 5 shows the step 308 of FIG. 3 for handling segment failure in more detail.

FIGS. 3 through 5 illustrate the steps of the procedure used in the first embodiment that are run at each of the interconnection devices. The basic steps for the procedure used for the failure detection and notification is explained with reference to FIG. 3. Upon start (box 300), the device listens for Type-1 messages. At box 302, the procedure checks whether or not an interconnection device Si (i=1,2) has not received a Type-1 message from the other interconnection device Sj for N1 consecutive periods of time from both sides (box 302). If this is true, the other interconnection device Sj is diagnosed to have failed, and the procedure exits "Yes" from box 302 and the procedure for processing an interconnection device failure (box 304) is executed. If this is false, the procedure exits "No" from box 302 and the method checks for the Type-1 message from the other interconnection device Sj (box 306). If the Type-1 messages arrive at an interconnection device Si, only from one side (box 306), the procedure exits "Yes" from box 306, indicating that a segment (containing a link and an RPR interface node) failure has occurred and the procedure for processing a segment failure (box 308) is executed. Otherwise, (i.e., if the Type-1 messages arrive at an interconnection device Si, from both sides) the procedure exits "No" from box 306, and terminates at box 310.

FIG. 4 expands step 304 of FIG. 3 that concerns the processing of the interconnection device failure in more detail. Upon start (box 400) the procedure checks for the location of the failed interconnection device (box 402). If the failed interconnection device is on the regular message path, then the procedure exits "Yes" from box 402 and all sources of messages in the first RPR R1 10 and the second RPR R2 12 are notified to use the other interconnection device and reroute the message through the protection path (box 404). This is followed by the notification of the O&M system about this failure (box 406). If the failed interconnection device is not on the regular path, the procedure exits "No" from box 402. In this case, message rerouting is not performed but the O&M system is informed of the failure (box 406). The failure reporting is followed by the termination of the procedure (box 408).

FIG. 5 displays the flowchart that expands the processing of the failure of a segment (box 308 of FIG. 3) in more detail. Upon start (box 500), the procedure analyzes the piggy-backed information in Type-1 messages (box 502) in order to identify the location of the failed segment. At box 504, the procedure checks whether the failed segment is on the regular message path. If the segment is on the regular message path, the procedure exits "Yes" from box 504 and a notification is sent to all message sources on the first RPR R1 and the second RPR R2 to use the protection path (box 506), and the O&M system is informed (box 508). If the segment is on the protection path, the procedure exits "No" from box 504. In this case, message re-routing is not necessary, but the failure is reported to the O&M system (box 508). The failure reporting is followed by the termination of the procedure (box 510).

The behavior of the system under different failure scenarios is explained with the help of FIGS. 6 through 10.

Figure 6:
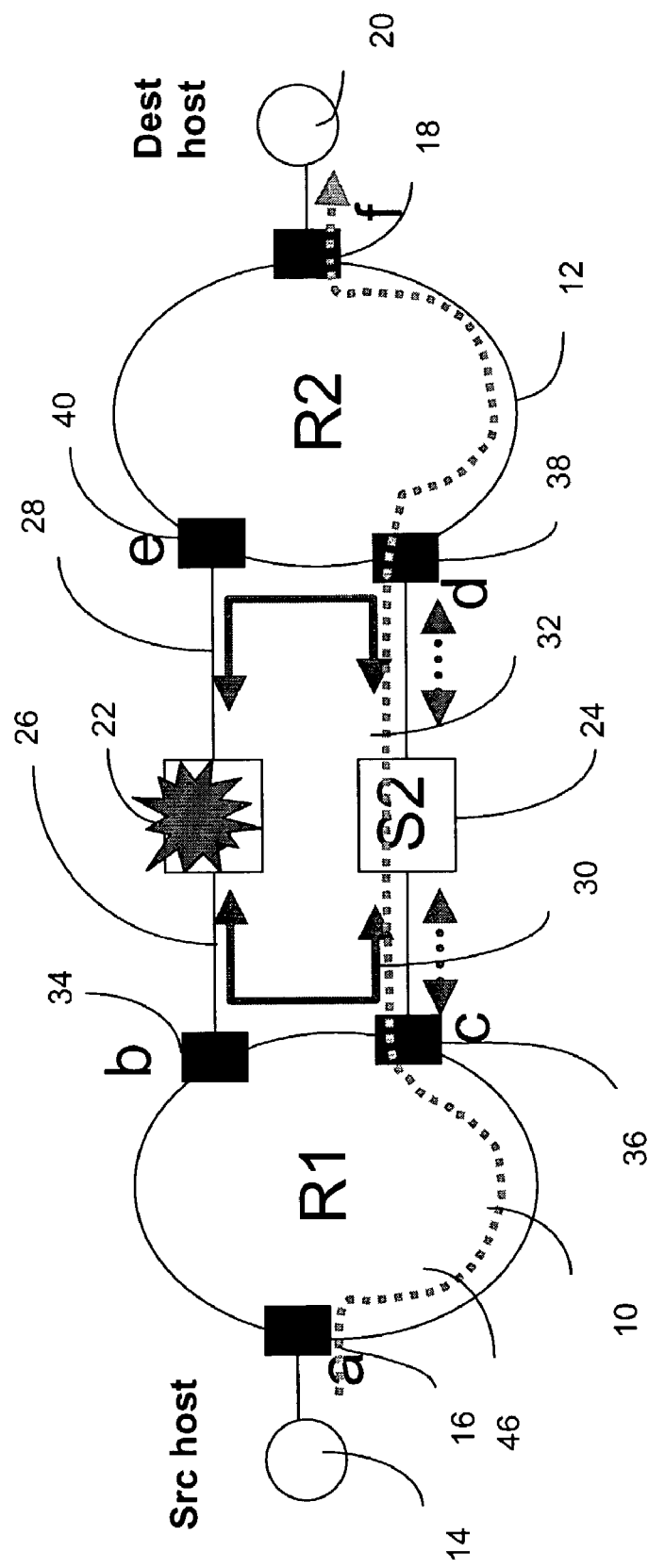
FIG. 6 presents an example scenario for an interconnection device failure.
Figure 7:
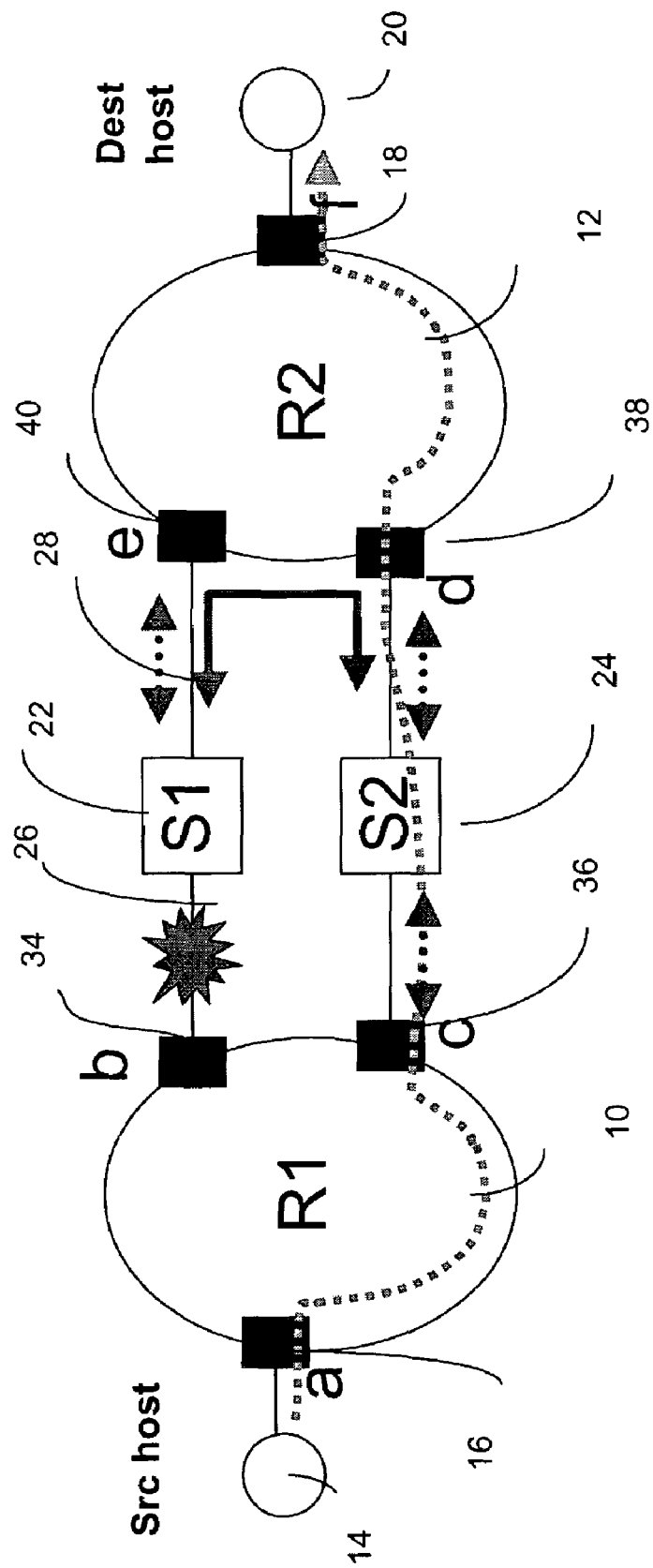
FIG. 7 presents an example scenario for an interconnection link failure in the regular path.
Figure 8:
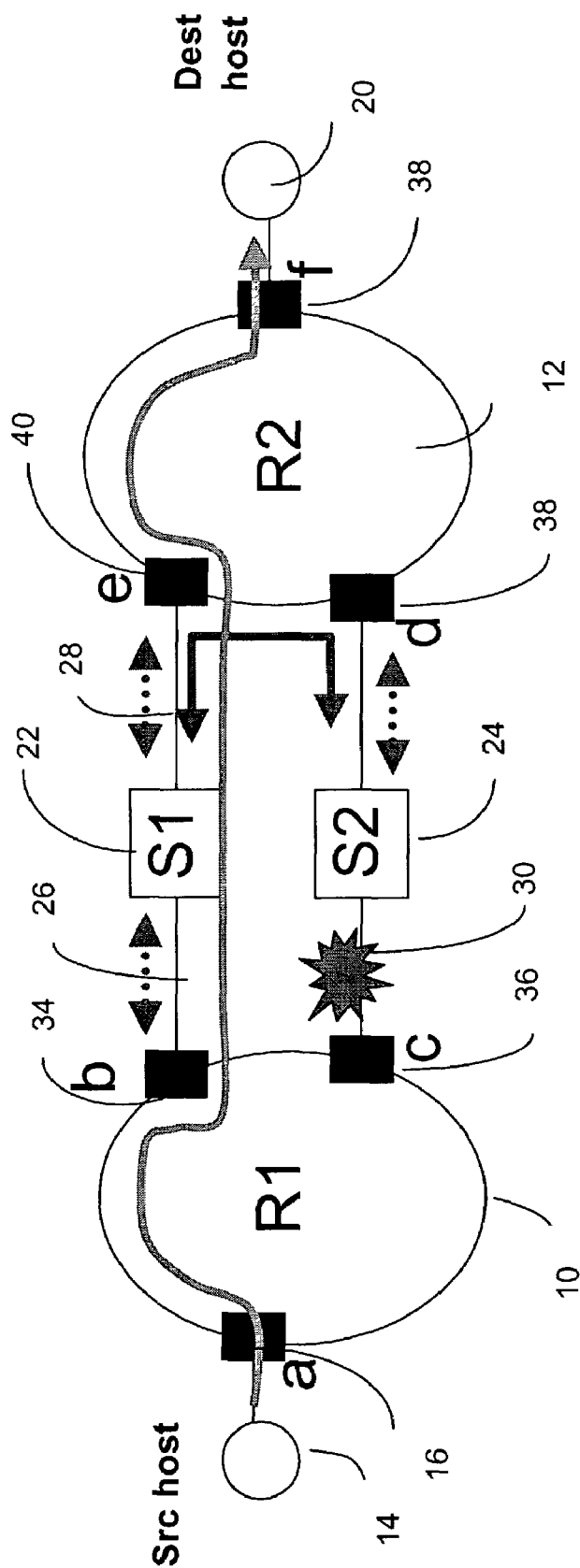
FIG. 8 presents an example scenario for an interconnection link failure in the protection path.

Interconnection Device Failure:

FIG. 6 illustrates an example of the failure of an interconnection device in the regular message path. This is diagnosed by the failure protection method presented in FIG. 3, when the second interconnection device S2 24 does not receive Type-1 messages for N1 successive periods. The processing of interconnection device failure (box 304 of FIG. 3), which is described in FIG. 4 are then executed. Since the failed first interconnection device S1 22 is on the regular path, a notification to reroute the message through the second interconnection device S2 24 is sent to the source node "a" 16 in the first RPR R1 10. In response to the notification, the source node "a" 16 reroutes the message through the protection path 46. The procedure also sends a failure report identifying the failed first interconnection device S1 22 to the O&M system. If the interconnection device on the protection path fails, no rerouting is necessary; only a failure report is sent to the O&M system.

Link Failure:

The method for failure protection described in FIG. 3, detects a segment failure when Type-1 messages are received from one side only. In case of a failure in the interconnection link in the regular path, such as the interconnection link S1-b 26 shown in FIG. 7, the first interconnection device S1 22 will not receive a Type-2 message, and this information will be piggy-backed on the Type-1 message exchanged between the first interconnection device S1 22 and the second interconnection device S2 24. Both interconnection devices S1 22 and S2 24 will diagnose a failure of the segment consisting of the first RPR interface node "b" 34 and the first interconnection link S1-b 26 (see FIG. 3). Both these interconnection devices will send a notification to source node "a" 16 and report the segment failure to the O&M system (see FIG. 5). Although the notification sent by the first interconnection device S1 22, using the first interconnection link "S1-b" 26, will not reach the source node "a" 16, the arrival of the notification from the second interconnection device S2 24, will enable source node "a" 16 to reroute the message through the protection path 46. An example of a failure of the second interconnection link "S2-c" 30 in the protection path 46 is presented in FIG. 8. As shown in FIG. 5, a rerouting notification is not sent, but the segment failure is reported to the O&M system.

Figure 9:
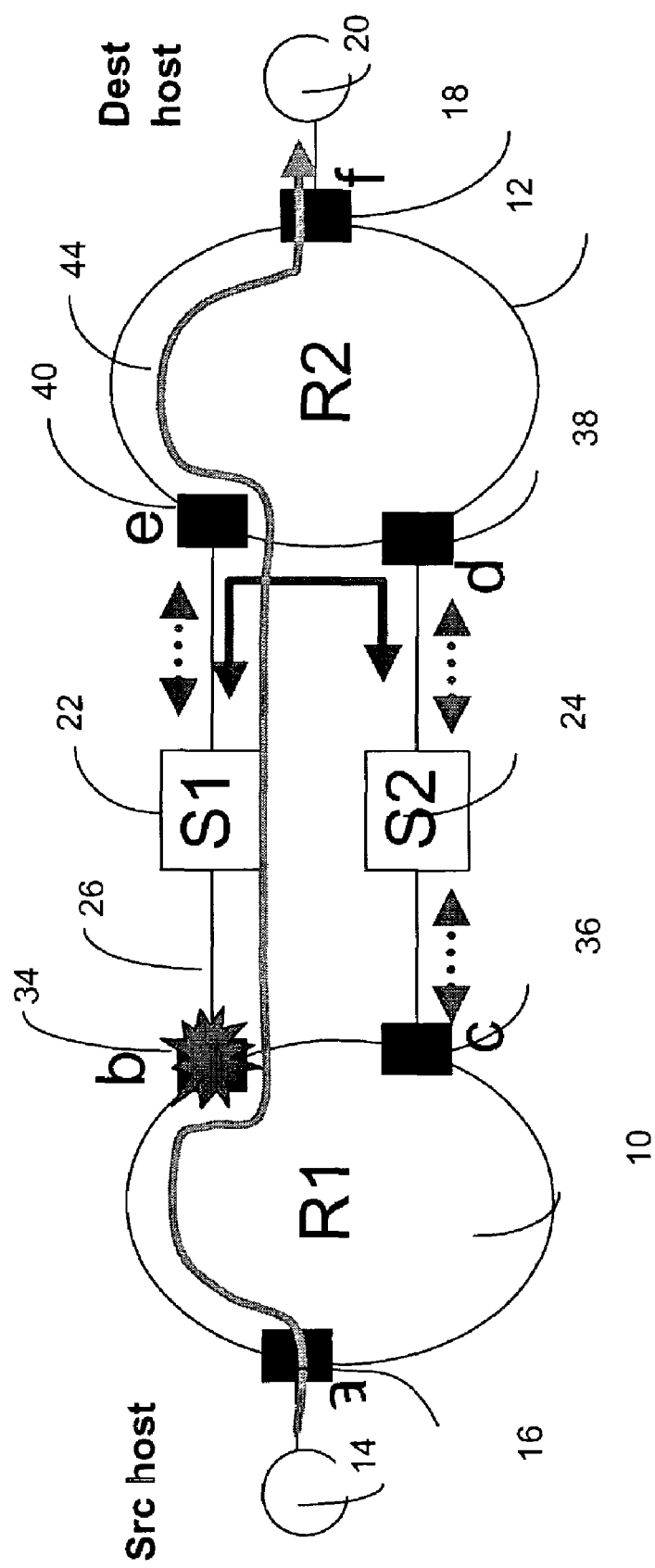
FIG. 9 presents an example scenario for an RPR interface node failure in the regular path.
Figure 10:
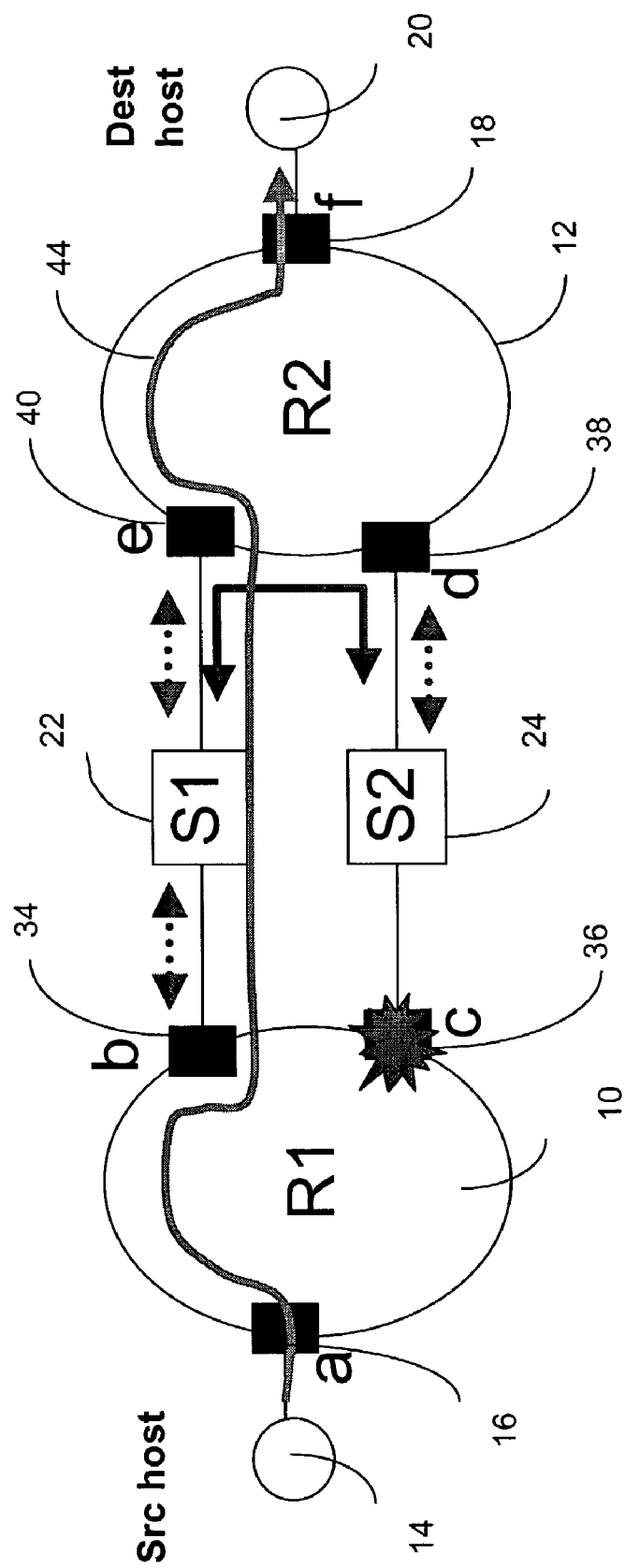
FIG. 10 presents an example scenario for an RPR interface node failure in the protection path.

RPR Interface Node Failure:

A failure scenario that captures the failure of the first RPR interface node "b" 34 is shown in FIG. 9. The absence of Type-1 messages from one side only is diagnosed in box 306 of FIG. 3, as a failure of a segment (box 308). The step of processing a segment failure (box 308) is further expanded in FIG. 5. The procedure analyzes the piggy-backed information in Type-1 messages to identify that the segment containing the first RPR interface node "b" 34 and the first interconnection link "S1-b" 26 connecting the first RPR interface node "b" 34 and the first interconnection device S1 22 has failed. Since this segment is on the regular message path 44, the procedure presented in FIG. 5 notifies the source node "a" 16 to reroute the message through the protection path 46. If an RPR interface node, such as the second RPR interface node "c" 36 (see FIG. 10) or the third RPR interface node "d" 38 on the protection path 46 fails, a rerouting message is not sent to the source node "a" 16. However, in all cases of RPR interface node failures, the O&M system is notified of the corresponding segment failure according to the procedure illustrated in FIG. 5.

Figure 11:
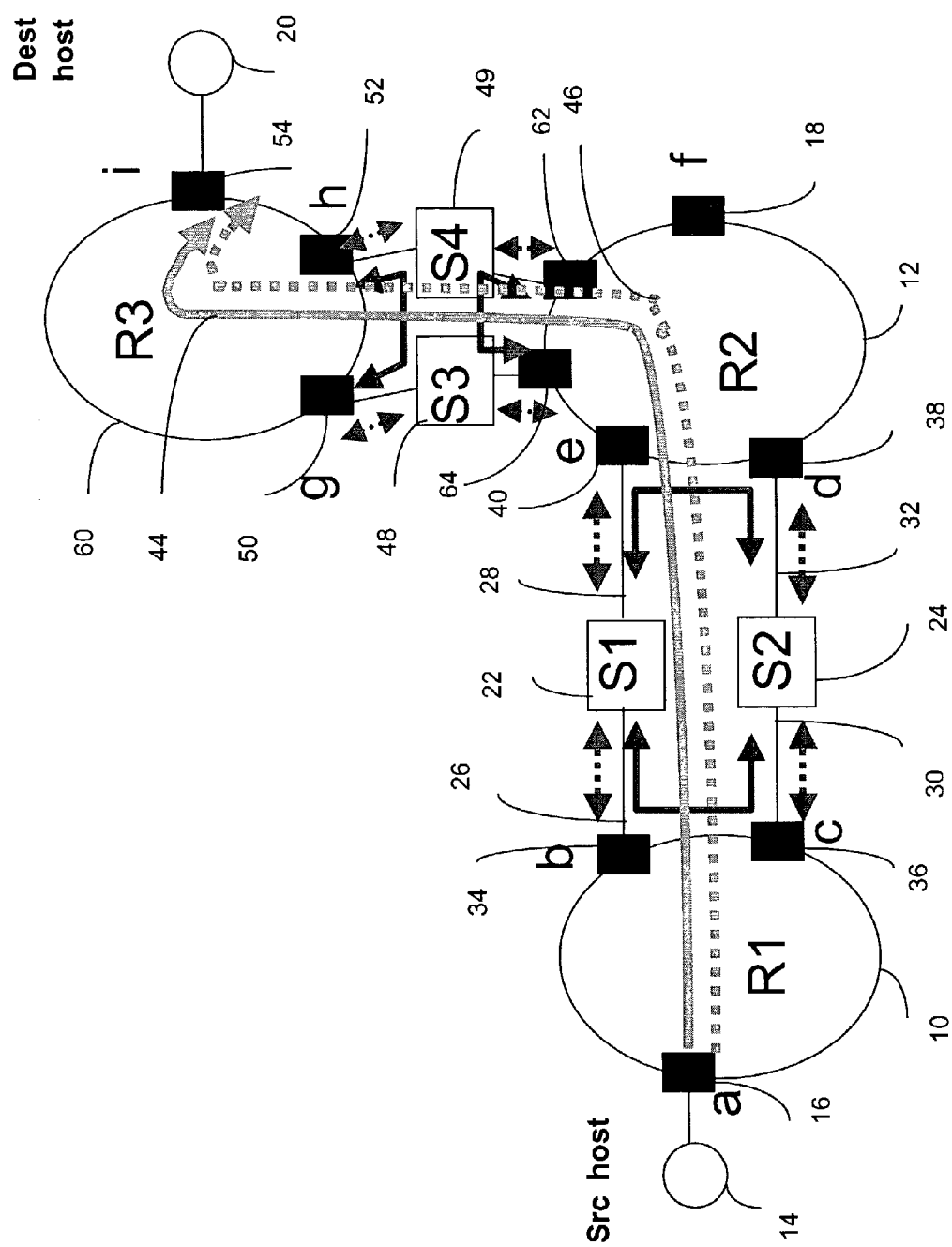
FIG. 11 illustrates a protected interconnection system for three RPRS.

With the help of FIG. 11, how the system and method of the first embodiment applies to a three-ring RPR system, is described. In a system described in FIG. 1, it is possible to introduce additional rings, such as, R3 60, using a pair of interconnection devices S3 48 and S4 49, four RPR interface nodes 62, 64, 50 and 52, and the concomitant interconnection links. Such multiple ring systems are likely to be useful in networks that cover a large and geographically dispersed area. The connection between R1 10 and R2 12 in FIG. 11 is exactly the same as presented in FIG. 1. An additional set of interconnection devices S3 48 and S4 49 is introduced to connect RPR R3 60 with RPR R2 12. Failure detection is achieved in exactly the same fashion as described earlier with the help of FIGS. 3 through 5. The protection switching mechanism for any source and node pair in two adjacent rings (R1-R2 or R2-R3) is exactly the same as described earlier. In case of a situation in which the source and destination nodes are located in R1 and R3 and a failure occurs in the regular path 44, the notification messages may have to go through an additional ring. Consider for example a situation in which the source and destination hosts are connected to "a" 16 and "i" 54. If S1 22 fails, the notification to the destination host has to go through an additional ring (R2 12).

A brief analysis of the time required for performing a protection switching, T, is provided. T has two components: time to detect a failure and the time required for performing the failure notification and the protection switching. Two types of failures, a segment failure and an interconnection device failure are handled by the invention. The timing analysis for a segment failure is presented first.

Since three consecutive Type-2 messages that are exchanged with a period of T2 are to be missing to detect a segment failure (see FIG. 3), the time to detect such a failure is $3T2+Tp2$ where Tp2 is the associated processing time at an interconnection device. Similarly the time to detect the absence of three consecutive Type-1 messages (from one side) that are exchanged with a period T1 (see FIG. 3) is $3T1+Tp1$ where Tp1 is the associated processing time at an interconnection device. An upper bound on T is achieved by summing these two components:

$$T<=3(T1+T2)+Tp1+Tp2+Tn+Tr$$

where Tn is the time elapsed from the detection of a segment failure to the time of reception of the failure notification by the source node and Tr is the time required for the source to reroute the message through the protection path. Typical values for T1 and T2 are 10 and 3 ms respectively whereas, the sum of the four processing times, Tp1, Tp2, Tn, and Tr is much lower than 11 ms. Thus T is clearly less than 50 ms.

An interconnection device failure is detected at the other interconnection device when three Type-1 messages are not received from both sides (see FIG. 3). An upper bound on the protection switching time is given by:

$$T<=3T1+Tp3+Tn+Tr$$

where Tp3 is the processing time associated with the detection of three consecutive misses of Type-1 message from both sides. Since the typical value of T1 is 10 ms and the sum of the processing times Tp3, Tn, and Tr is much lower than 20 ms, T is less than 50 ms.

Thus the protection switching time achieved by the invention in case of a failure in the segment or interconnection device is less than 50 ms.

Figure 12:
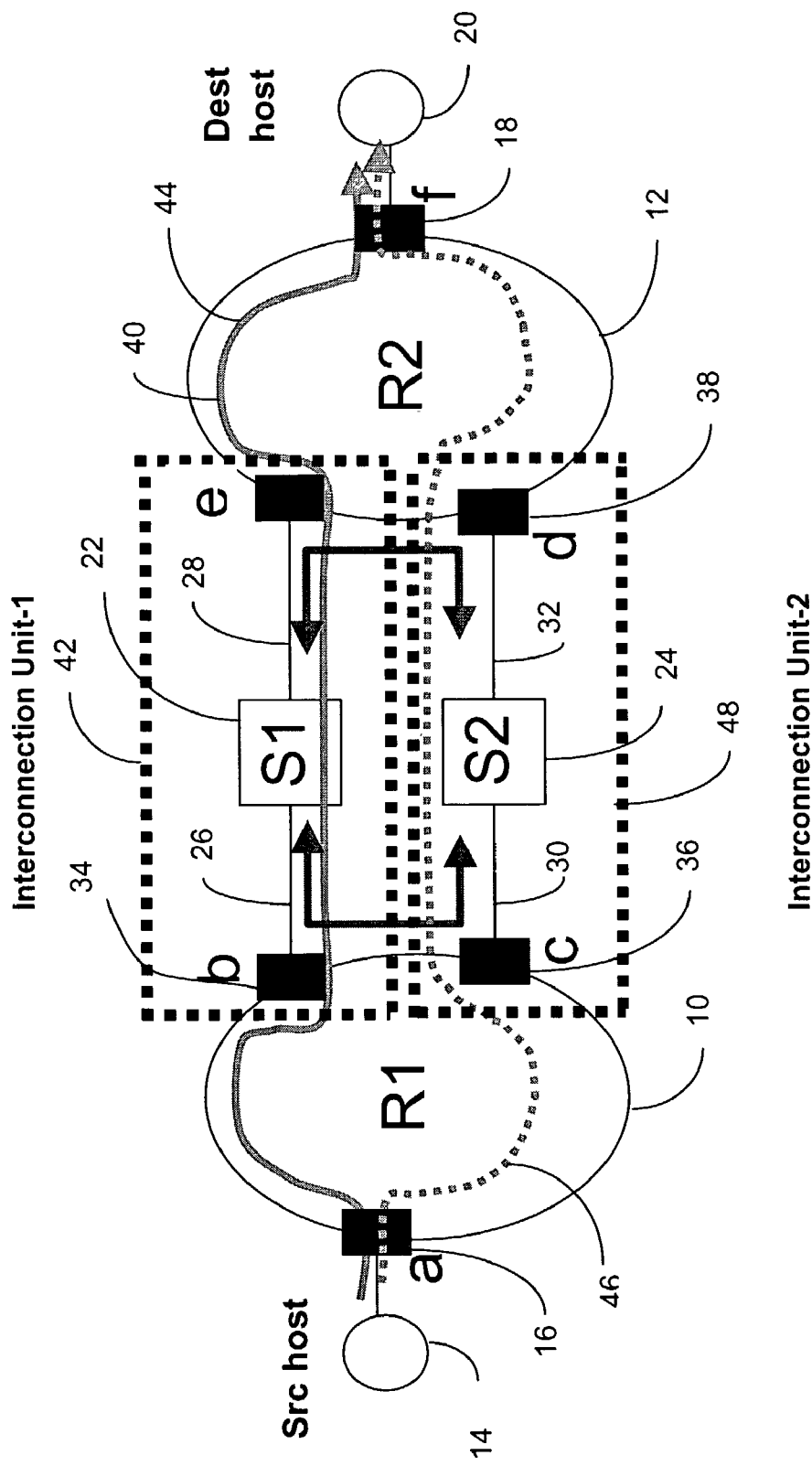
FIG. 12 shows a protected interconnection system for two RPRs using dual interconnection units, according to the second embodiment of the invention.

In a second embodiment of the protection system (shown in FIG. 12), the interconnection between the rings is performed through a set of dual interconnection units (42 and 48), each of which includes an interconnection device, two RPR interface nodes, and the corresponding interconnection links. For example, "interconnection unit-1" 42 contains the first RPR interface node "b" 34, the first interconnection device S1 22, and the fourth RPR interface node "e" 40; whereas, the "interconnection unit-2" 48 includes the second RPR interface node "c" 36, the second interconnection device S2 24 and the third RPR interface node "d" 38 (see FIG. 11). The first and the fourth interconnection links 26 and 28 are used to interconnect the first RPR interface node "b" 34 and the fourth RPR interface node "e" 40 with the first interconnection device S1 22. The second and the third interconnection links 30 and 32 are used for connecting the second RPR interface node "c" 36 and the third RPR interface node "d" 38 with the second interconnection device S2 24. The curved line (a-b-S1-e-f) 44 displays the regular message path between a source node "a" 16 and a destination node "f" 18, each of which is connected to the corresponding host system. The dotted line (a-c-S2-d-f) 46 shows the protection path between source node "a" 16 and the destination node "f" 18. Note that both the interconnection units are identical in construction and the regular path 44 between the rings is provided by "interconnection unit-1" 42, whereas the protection path 46 is provided by the "interconnection unit-2" 48.

Instead of using Type-2 messages a control entity in the unit keeps track of the status of links and RPR interface nodes in the unit. This information is piggy-backed on the Type-1 messages that flow between the first interconnection device S1 22 and the second interconnection device S2 24, each of which is inside a different interconnection unit. As in the case of the first embodiment, the first interconnection device S1 22 and the second interconnection device S2 24, use Type-1 messages and the piggy-backed information to detect an interconnection device failure or a segment failure.

Prior art has focused on protection switching on a single RPR. Multiple RPR rings for interconnecting a large number of traffic sources is becoming important especially in the context of large metropolitan areas. As described in the "Background of the Invention", existing work in the area of protection switching rely on the Layer-2 STP or Layer-3 routing protocols that are characterized by high convergence times, typically of the order of seconds. There is a strong requirement for achieving the protection switching in a shorter period of time. This invention fills the gap by providing a method and system for interconnecting multiple RPRs that achieve a protection switching time of less than 50 ms for inter-ring traffic. Such a protection switching time is consistent with the protection switching time of a failure within a single RPR.

Numerous modifications and variations of the present invention are possible in light of the above teaching. It is therefore to be understood that within the scope of the appended claims, the invention may be practiced otherwise than as specifically described herein.

One such modification is achieved by connecting an interconnection device to more than two RPRs. Such a stack of rings can be used to increase the traffic serving capacity of the network. Each interconnection device is a hub that is connected to each of the RPRs through a dedicated interconnection link. As in the first embodiment there is a regular and a protection path between any two rings. The regular path uses one of the interconnection devices and the associated RPR interface nodes and interconnection links. The protection path uses the other interconnection device and the associated RPR interface nodes and interconnection links. Periodic keep alive messages are used to detect failures in the system and initiating message re-routing when the regular path is impaired.

We claim:

1. A method for failure protection between interconnected Resilient Packet Rings (RPRs) in a multiple RPR network, including at least two adjacent RFRs, including a first RPR and a second RPR, for sending or receiving inter-ring messages using a path; the first RPR including at least one node to be used as a source node provided for sending messages and a first RPR interface node and a second RPR interface node; the second RPR including at least one node to be used as a destination node provided for receiving messages and a third RPR interface node and a fourth RPR interface node, the method comprising the steps of:

detecting a failure in the path between the first RPR and the second RPR; and rerouting messages from the source node in the first RPR to the destination node in the second RPR, upon detection of the failure;

wherein the step of detecting the failure between the first RPR and the second RPR, comprising the steps of:

providing a regular path for routing inter-ring traffic between the two adjacent RFRs when no failure has occurred in the path; and providing a protection path for routing inter-ring traffic between the two adjacent RPRs, when a failure occurs in the regular path;

wherein the step of providing the regular path, comprising the steps of:

providing a first interconnection device connecting the first RPR interface node and the fourth RPR interface node, associated with the regular path between the first RPR and the second RPR; and providing a first set of interconnection links, including a first interconnection link and a fourth interconnection link, for connecting the first RPR interface node and the fourth RPR interface node respectively, to the first interconnection device;

wherein said step of detecting the failure comprising the step of exchanging Type-2 keep alive messages between any one of the four RPR interface nodes and the interconnection device it is directly connected with;

the Type-2 keep alive message being sent at a regular interval of time, with a time period of T2; and wherein the step of detecting the failure, further comprising the step of detecting a segment failure from the absence of the Type-2 keep alive message arrivals for number of successive periods of N2 at any RPR interface node or interconnection device.

2. A method as claimed in claim 1, wherein the step of detecting the segment failure, comprising the step of providing a segment failure information, upon detection of the segment failure, the segment failure information being piggy-backed on the Type-1 keep alive message.

3. A method as claimed in claim 2, wherein the step of providing the segment failure information comprising the step of identifying a tailed segment from the piggy-backed segment failure information in said Type-1 keep alive messages.

4. A method as claimed in claim 3, wherein the step of identifying the failed segment, further comprising steps of:

sending a fault report to an O&M system; and notifying the source node to reroute the message through the protection path if the failed segment is on the regular message path.

5. A method as claimed in claim 1, wherein the total time taken for completing the steps of detecting the failure and rerouting of messages is less than 50 ms.

6. A method for failure protection between interconnected Resilient Packet Rings (RPRs) in a multiple RPR network, including at least two adjacent RPRs, including a first RPR and a second RPR, for sending or receiving inter-ring messages using a path; the first RPR including at least one node to be used as a source node provided for sending messages and a first RPR interface node and a second RPR interface node; the second RPR including at least one node to be used as a destination node provided for receiving messages and a third RPR interface node and a fourth RPR interface node, the method comprising the steps of:
- detecting a failure in the path between the first RPR and the second RPR; and
- rerouting messages from the source node in the first RPR to the destination node in the second RPR, upon detection of the failure;
- wherein the step of detecting the failure between the first RPR and the second RPR comprises the steps of:
- providing a regular path for routing inter-ring traffic between the two adjacent RPRs when no failure has occurred in the path; and
- providing a protection path for routing inter-ring traffic between the two adjacent RPRs, when a failure occurs in the regular path;
- wherein the step of providing the regular path comprises the steps of:
- providing a first interconnection device connecting the first RPR interface node and the fourth RPR interface node, associated with the regular path between the first RPR and the second RPR; and
- providing a first set of interconnection links, including a first interconnection link and a fourth interconnection link, for connecting the first RPR interface node and the fourth RPR interface node respectively, to the first interconnection device;
- wherein the step of detecting the failure comprises the step of exchanging Type-1 keep alive messages between the first interconnection device and the second Interconnection device;
- the Type-1 keep alive message being sent by each interconnection device in both directions at a regular interval of time, with a time period of T1;
- wherein the step of detecting the failure further comprises the step of detecting a failure in one interconnection devices, when the other interconnection device detects an absence of the Type-1 keep alive message for number of successive periods N1, from both directions.

7. A method as claimed in claim 6, wherein the step of detecting the failure, comprising the step of diagnosing segment failure at any one of interconnection device from the absence of the Type-1 keep alive message for N1 successive periods, only from one direction.

8. A method as claimed in claims 6, wherein step of detecting the failure in the interconnection device further comprising the steps of:
- sending a fault report to an O&M system; and
- notifying the source node to reroute the message through the protection path if the failed interconnection device is on the regular message path.

9. A system for failure protection between interconnected RPRs in a multiple RPR network, including at least two adjacent RPRs, a first RPR and a second RPR for sending or receiving messages using a path; the first RPR including at least one node to be used as a source node provided for sending messages; the second RPR including at least one node to be used as a destination node provided for receiving messages and a third RPR interface node and a fourth RPR interface node, the system comprising:
- means for detecting a failure in the path between the first RPR and the second RPR; and
- means for rerouting messages from the source node in the first RPR to the destination node in the second RPR, upon detection of the failure;
- wherein the path between the two adjacent RPRs comprises:
- a regular path provided for routing inter-ring traffic between the two adjacent RPRs when no failure has occurred in the path; and
- a protection path provided for routing inter-ring traffic between the two adjacent RPRs, when a failure occurs in the regular path;
- wherein the regular path comprises:
- a first interconnection device, connecting a first RPR interface node and the fourth RPR interface node, associated with the regular path between the first RPR and the second RPR; and
- a first set of interconnection links, including a first interconnection link and a fourth interconnection link, for connecting the first RPR interface node and the fourth RPR interface node respectively to the first interconnection device;
- wherein periodic Type-2 keep alive messages are exchanged between any one of the four RPR interface nodes and the interconnection device it is directly connected with;
- the Type-2 keep alive messages being sent at a regular interval of time, with a time period of T2,
- wherein a segment failure is detected from the absence of the Type-2 keep alive message arrivals for number of successive periods of N2 at any one of the RPR interface node or interconnection device.

10. A system as claimed in claim 9, wherein upon detection of the segment failure, a segment failure information is piggy-backed on the Type-1 keep alive message.

11. A system as claimed in claim 10, wherein the piggy-backed segment failure information in said Type-1 keep alive messages is used by the interconnection device to identify a failed segment.

12. A system as claimed in claim 11, further comprises:
- means for sending a fault report message to an Q&M system; and
- means for notifying the source node to reroute the message through the protection path if the failed segment or the failed interconnection device is on the regular message path.

13. A system for failure protection between interconnected RPRs in a multiple RPR network, including at least two adjacent RPRs, a first RPR and a second RPR for sending or receiving messages using a path; the first RPR including at least one node to be used as a source node provided for sending messages; the second RPR including at least one node to be used as a destination node provided for receiving messages and a third RPR interface node and a fourth RPR interface node, the system comprising:
- means for detecting a failure in the path between the first RPR and the second RPR; and
- means for rerouting messages from the source node in the first RPR to the destination node in the second RPR, upon detection of the failure;
- wherein the path between the two adjacent RPRs comprising:

a regular path provided for routing inter-ring traffic between the two adjacent RPRs when no failure has occurred in the path; and a protection path provided, for routing inter-ring traffic between the two adjacent RPRs, when a failure occurs in the regular path wherein the regular path comprising:

a first interconnection device, connecting a first RPR interface node and the fourth RPR interface node, associated with the regular path between the first RPR and the second RPR; and a first set of interconnection links, including a first interconnection link and a fourth interconnection link, for connecting the first RPR interface node and the fourth RPR interface node respectively to the first interconnection device;

wherein Type-1 keep alive messages are exchanged between the first interconnection device and the second interconnection device;

the Type-1 keep alive message being sent by any one of the interconnection device in both directions at a regular interval of time, with a time period of T1 wherein the segment failure is diagnosed at any one of the interconnection device from the absence of the Type-1 keep alive message for number of successive periods of N1, only from one direction.

14. A system as claimed in claim 13, further comprises:

means for sending a fault report message to an O&M system; and means for notifying the source node to reroute the message through the protection path if the failed segment or the failed interconnection device is on the regular message path.

15. A system as claimed in claim 13, wherein total time taken for the detection of failure and rerouting of messages is less than 50 ms.

* * * * *